United States Patent [19]

Erickson

[11] Patent Number: 4,746,502

[45] Date of Patent: May 24, 1988

[54] LIQUID PHASE THERMAL SWING CHEMICAL AIR SEPARATION

[75] Inventor: Donald C. Erickson, Annapolis, Md.

[73] Assignee: Air Products and Chemicals, Inc., Allentown, Pa.

[21] Appl. No.: 769,633

[22] Filed: Aug. 26, 1985

[51] Int. Cl.⁴ .............................................. C01B 13/00
[52] U.S. Cl. .................. 423/579; 423/210.5; 423/219
[58] Field of Search ............... 423/210.5, 219, 579

[56] References Cited

U.S. PATENT DOCUMENTS

| | | | |
|---|---|---|---|
| 3,121,611 | 2/1964 | Parker | 423/579 |
| 3,310,381 | 7/1967 | Halstead | 423/579 |
| 3,330,381 | 3/1967 | Guerricri | 423/579 |
| 3,766,718 | 10/1973 | Campbell | 55/228 |
| 4,089,938 | 5/1978 | Turner | 423/579 |
| 4,132,766 | 1/1979 | Erickson | 423/579 |
| 4,287,170 | 9/1981 | Erickson | 423/579 |
| 4,340,578 | 7/1982 | Erickson | 423/579 |
| 4,521,398 | 5/1985 | Erickson | 423/579 |
| 4,529,577 | 7/1985 | Chen et al. | 423/219 |
| 4,565,685 | 1/1986 | Cassano | 423/579 |

OTHER PUBLICATIONS

U.S. Dept. of Commerce NTIS Final Report DOE Contract DE-AC01-79CS40287–Energy Concepts Company, Feb. 1983, Principal Investigator: Donald C. Erickson, Entitled; "Oxygen Production by the Moltox ™ Process".

Primary Examiner—John Doll
Assistant Examiner—Wayne A. Langel
Attorney, Agent, or Firm—Geoffrey L. Chase; James C. Simmons; William F. Marsh

[57] ABSTRACT

A temperature swing absorption separation of oxygen from air is performed with an oxygen acceptor of alkali metal nitrate and nitrite.

7 Claims, 2 Drawing Sheets

LIQUID PHASE THERMAL SWING CHEMICAL AIR SEPARATION

The government of the United State of America has rights in this invention pursuant to Contract No. DE-AC07-82CE40544 awarded by the U.S. Department of Energy.

TECHNICAL FIELD

The present invention is directed toward separating oxygen and optionally also nitrogen from air using a temperature (thermal) swing process configuration which provides unique and unexpected advantages when applied to a liquid phase oxygen acceptor consisting essentially of alkali metal nitrate and nitrite mixture including at least about ¼% oxides.

BACKGROUND ART

Historically there have been two primary embodiments of chemical air separation: the Brin process, using solid phase BaO as oxygen acceptor, and the DuMotay process, using $MnO_2$ in caustic. Originally the processes were batch mode, using either temperature or pressure swing. In temperature swing, the desorber temperature is hotter than the absorber; in pressure swing the absorber pressure is higher than the desorber.

More recently continuous versions of both Brin and DuMotay processes have been disclosed. U.S. Pat. Nos. 3,121,611 and 4,089,938 disclose the continuous circulation of an $MnO_2$ containing mixture between absorber and desorber in an adiabatic loop, i.e., with no indirect heat transfer into or out of the oxygen acceptor, and hence the absorber and desorber are at approximately the same temperature. The effect of pressure swing is obtained without requiring the total pressure to differ by using an inert stripping gas (steam) which is easily separable from the product $O_2$ to reduce the oxygen partial pressure.

U.S. Pat. No. 3,310,381 discloses a continuous version of the Brin process in a combination pressure and temperature swing configuration. Air is cocurrently contacted with the oxygen acceptor in a heat exchanged absorber (i.e., non-adiabatic absorber) at about 600° C. and a pressure only marginally above atmospheric. Then the oxidized acceptor is heated to 800° C. in a fired heater, reduced in pressure, and allowed to desorb $O_2$, causing the temperature to drop to about 720° C. Since both solid BaO and pure liquid $BaO_2$ are at all times present in the acceptor, the system is invariant. i.e., the oxygen partial pressure is strictly determined by the temperature.

U.S. Pat. No. 3,766,718 discloses a continuous pressure swing process using liquid $K_2O_2$ as oxygen acceptor.

U.S. Pat. Nos. 4,340,578, 4,287,170, and 4,521,398 disclose a continuous pressure swing air separation process utilizing a liquid mixture of alkali nitrate and nitrite salt as acceptor. The acceptor remains liquid throughout the process, and is circulated in an adiabatic loop, i.e., having no intentional indirect heat exchange. U.S. Pat. No. 4,132,766 discloses essentially the same acceptor in an isothermal loop, i.e., a loop in which desorber heat is indirectly transferred to the absorber.

In all of the above processes, either large pressure differences are required between the absorber and desorber, requiring substantial investment for compression and expansion equipment, or if not, that requirement is avoided by either applying very large thermal swings (on the order of 200° C. temperature change) requiring very large heat flows or by supplying undesirably high amounts of inert stripping gas (e.g., more than 10 moles of steam for every mole of oxygen produced).

What is needed is a chemical air separation process in which the pressure difference between absorber and desorber is less than a factor of about 3 in order to minimize the cost of compression equipment; in which no inert easily separable stripping gas is required; and, in which a high recovery is achieved (fraction of $O_2$ in air which ends up as $O_2$ product) without requiring an enormous flow of heat into and subsequently out of the acceptor.

If the liquid phase alkali nitrate-nitrite acceptor were subjected to the continuous thermal swing processing disclosed in the prior art. e.g., in U.S. Pat. No. 3,330,381, the first two objectives above would readily be obtained. However, the required heat transfer into and out of the salt would be greatly excessive, if reasonable recovery rates of say 80% or better were required. Lower recovery rates would be equally undesirable, as then more plant and capital is required for a given $O_2$ output, since more air must be processed. One reason the heat flow requirement of a thermal swing process would be expected to be higher using the alkali nitrite-nitrate acceptor than when using the Brin acceptor is that the reaction heat is higher for the former acceptor. It requires about 46 kcal/mole $O_2$ desorbed, whereas the $BaO_2$ only requires 39 kcal/mole $O_2$ desorbed.

In the prior art Brin process, the acceptor is heated by about 200° C. to a temperature of 800° C., and then flashed to release oxygen, cooling the acceptor to 720° C. The cooling by 80° C. corresponds to the 39 kcal/mole of produced oxygen reaction heat and hence the total heating requirement is seen to be about 200/80 times 39 or 97.5 kcal/mole $O_2$. Were the liquid nitrate acceptor applied in the same process. the expected heat requirement would be 200/80 times 46 or 115 kcal/mole $O_2$. In contrast, the herein disclosed process only requires less than 80 kcal/mole $O_2$.

DISCLOSURE OF INVENTION

A new thermal swing chemical air separation process is disclosed which is applicable to the liquid phase alkali nitrate-nitrite acceptor and which when applied to that acceptor results in greatly reduced requirements for heating and cooling the acceptor. In particular, air which has been cleaned and dried is countercurrently contacted with liquid alkali nitrate-nitrite acceptor which has been cooled to below about 540° C. the oxidized acceptor is regeneratively heated to at least about 580° C. and then further heated to at least about 620° C. in a heater supplied with high quality primary heat, e.g., a combustion process. The amount of heat supplied by external or primary heat is less than 80 kcal per gram mole of $O_2$ produced (1 kcal=4184 joule). The $O_2$ desorbed by the external heating step, preferably at least half of the total $O_2$ produced, is separated from the acceptor, and optionally additional $O_2$ is desorbed from the acceptor by at least one of pressure reduction and stripping with a nitrogen containing gas. The $O_2$ depleted acceptor is regeneratively cooled in heat exchange with the oxidized acceptor to below 580° C. and further cooled by heat rejection to below 540° C. Finally the cooled oxygen-depleted acceptor is recycled to the adiabatic countercurrent absorber. The absolute pressure of the desorbed $O_2$ is at least ¼ the absolute pressure of the absorber, and may exceed the absorber pressure. At least about 80% of the $O_2$ contained in the supply air is recovered as $O_2$ product. The absorber contains at least about two theoretical stages of countercurrent contact, and preferably at least six. The nitrogen containing strip gas may be part of the absorber exhaust gas or alternatively part of the supply air.

BEST MODE FOR CARRYING OUT THE INVENTION

Figure 1:
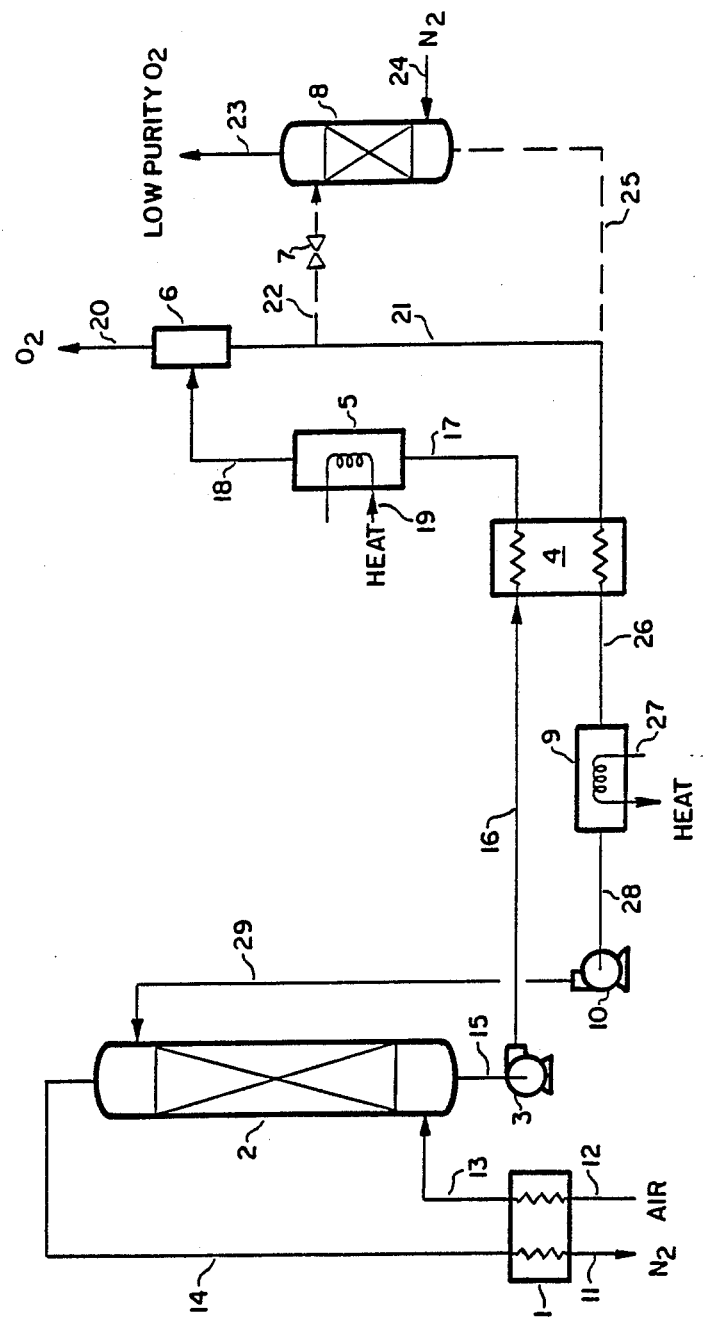
FIG. 1 is a schematic flowsheet indicating the processing sequence necessary to achieve the unique and advantageous temperature swing result with the liquid acceptor.

Referring to FIG. 1, air in line 12 which has been cleaned, compressed to between about 1.5 and 25 ATA, dried, and scrubbed of $CO_2$, is heated in heat exchanger 1 against exhaust $N_2$ product (oxygen depleted air) and then injected in line 13 into the bottom of countercurrent adiabatic absorber 2, where it flows upward and oxidizes the downward flowing liquid acceptor. The exiting air in line 14 is in near equilibrium with the low $O_2$ content acceptor entering the top of the absorber, whereas the exiting acceptor in line 15 is loaded with oxygen to near equilibrium with the high $O_2$ content of the entering air, as a result of the countercurrent contact with the unique liquid acceptor. The oxidized acceptor is circulated by either pressure drop or, if necessary, by pump 3 in line 16 to regenerative heat exchanger 4, in which it picks up at least about half of its total sensible heat temperature increase, and then in line 17 to heater 5, where it is further heated by an outside heat source 19 to above about 620° C. Any $O_2$ desorbed during heating in 5, plus any additional desorbed in line 18 due to pressure reduction or residence time in the separator, is separated from the acceptor in separator 6 and withdrawn as product in line 20. In some embodiments additional $O_2$ desorption 23 will be desired, which can be obtained by either or both of two means. The pressure can be further reduced via pressure reduction valve 7 in line 22, and/or the acceptor can be countercurrently stripped with a nitrogen containing gas 24 in desorber/stripper 8. The nitrogen containing gas can be either part of the air supplied to absorber 2 or part of the oxygen depleted air 11 exhausted in line 14 from absorber 2. If $N_2$ stripping is used, the $O_2$ product withdrawn from desorber/stripper 8 will be low purity, e.g., 70 to 95% $O_2$. Reduced acceptor is returned from desorber/stripper 8 in line 25.

It is emphasized that the nitrogen containing gas is not a gas which is "easily separable" from the product oxygen. Any nitrogen introduced in this step will necessarily end up in this segment of the product oxygen. Were the nitrogen injected cocurrently, only a small reduction in acceptor oxygen loading ($pO_2$) would be achieved at the expense of much nitrogen contamination of the product. However, by using the disclosed countercurrent nitrogen injection, a very large reduction in acceptor oxygen loading is obtained from relatively minor $N_2$ contamination, e.g., only 5 to 30% N in the product $O_2$.

The net effect of this stripping is a lowering of the final desorber $pO_2$, i.e., increased pressure swing, which further reduces the required temperature swing and accompanying heat input necessary to achieve 80% or better $O_2$ recovery. The cost of this benefit is a small reduction in $O_2$ purity.

The oxygen depleted acceptor in line 21 from either or both of 6 and 8, whichever is used is then cooled in regenerative exchanger to below about 580° C., transferred in line 26, and further cooled in cooler 9 to below about 540° C. against outside coolant 27, and then pumped to the absorber 2 by pump 10 through lines 28 and 29.

The three parameters of temperature difference between absorber and desorber, pressure ($pO_2$) difference between absorber and desorber, and $O_2$ recovery are interrelated. In the absence of stripping gas, a total pressure ratio of less than 3 between absorber and desorber means the desorber $pO_2$ is actually higher than the absorber $pO_2$. In order to achieve recoveries of 80% or higher at a pressure ratio below 4, a temperature swing of about 80° C. is required. More recovery or lower pressure ratio requires even more temperature change. Using the prior art processing sequence with a cocurrent absorber, a much greater temperature change would be required, on the order of 200° C. or more. With countercurrent absorption equivalent to at least three theoretical stages of contact, less than half as much thermal swing is necessary when using this liquid acceptor for a given recovery and pressure ratio. Furthermore, using regenerative heating and cooling to supply at least half the temperature change, the amount of primary heat which must be supplied to the oxidized acceptor and rejected from the oxygen depleted acceptor is halved again. These reduction are important, as the required heat flows are still large.

Example operating conditions for the FIG. 1 flowsheet, based on a computer simulation of the thermal swing process disclosed, are as follows. The liquid acceptor exits the absorber 2 at a pressure of 4 ATA and a temperature of 499° C., and with a composition of 98.2% nitrate, 1.2% nitrite, balance oxides. The cationic composition is equimolar sodium and potassium ions. This mixture is heated to 649° C. and depressurized to 1.33 ATA, which causes it to desorb 0.0378 moles of $O_2$ per mole of salt circulated. The heating is in two stages: to 625° C. in regenerative heat exchanger 4, and then remaining sensible heat to 649° C. plus latent reaction heat in external heater 5. The total heat demand at heater 5 is about 67 kcal per mole $O_2$ produced. The salt exiting the separator is 90.6% nitrate, 8.8% nitrite, balance oxides and at very close to 649° C. It is cooled to 525° C. in regenerative heat exchanger 4, then further cooled to 455° C. in external cooler 9, pressurized to 4 ATA, and recycled to the top of absorber 2. At the absorber, 0.182 moles of air at 4.1 ATA are supplied, and approximately 98% of the $O_2$ is recovered, leaving a fairly pure $N_2$ overhead at 4 ATA.

If the high recovery and high $N_2$ purity are not required, desorber temperatures at least 50° C. hotter can be used.

If the acceptor is not depressurized to desorption pressure until after heat addition, there will be an adiabatic cooling of approximately 50° C. to supply the reaction heat. In the above example, heating to 699° C. vice to 649° C. would be required. This temperature increase greatly increases the salt corrosivity, and hence it is desirable to minimize this $\Delta T$ by depressurizing the acceptor sufficiently prior to heating that at least half of the $O_2$ desorbs in the heater.

The primary heat can be any source capable of heating the acceptor to above about 620° C., such as a combustion process, either complete or partial combustion, or the sensible heat of high temperature gases.

Due to the large amount of heat rejected by cooler 9, approximately equal in magnitude to the heat supplied at heater 5, it should be applied to a useful purpose, namely heating a process stream. Since the heat is available at about 500° C., it can usefully heat any process stream to at least about 260° C.

Figure 2:
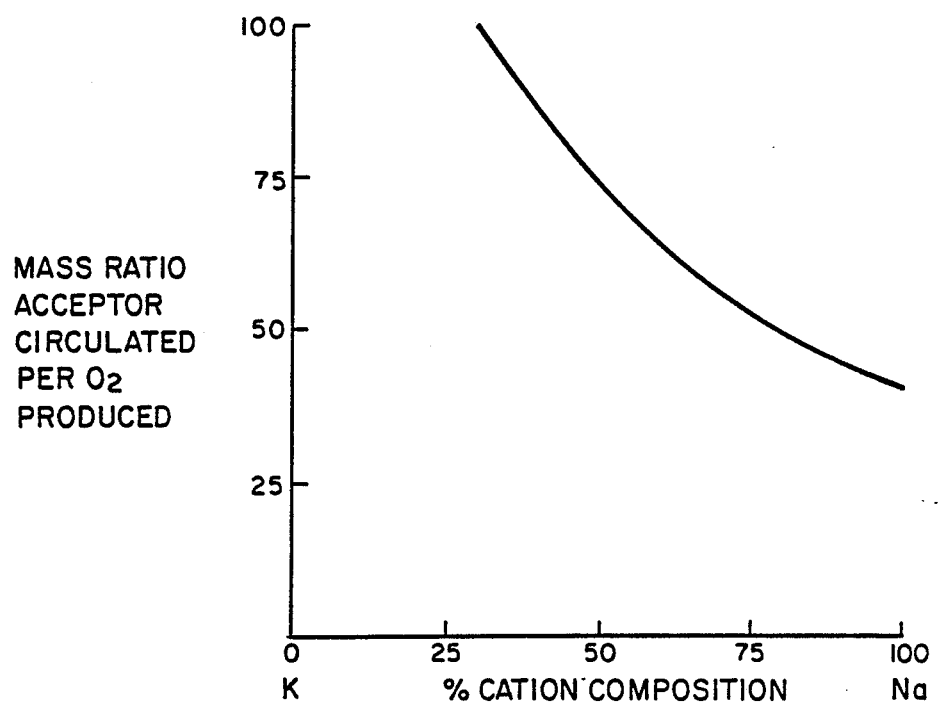
FIG. 2 illustrates the effect of acceptor cationic composition on required acceptor circulation rate.

In contrast to prior art thermal swing $O_2$ acceptors, which have the characteristic that once the temperature is fixed the oxygen partial pressure is also fixed or invariant, the disclosed liquid absorbent allows both temperature and $pO_2$ to be varied independently. Once both those values are fixed, however, the ratio of nitrate to nitrite is also fixed. The degree to which this ratio varies between absorber and desorber determines the required salt circulation rate. For a fixed temperature and $pO_2$, the nitrate to nitrite ratio can be varied by changing the cationic composition of the acceptor. FIG. 2 shows this effect, in units of mass of acceptor circulated per unit mass of $O_2$ produced. These circulation rates apply to the same computer simulated operating conditions as described above: absorber at 4 ATA, 499° C. and desorber at 1.33 ATA, 649° C., with 98% $O_2$ recovery at better than 99.5% purity. As shown, the required acceptor circulation rate can unexpectedly be substantially reduced by increasing the proportion of Na+ cations.

Changing the acceptor cations from 100% Na to 90% Na, 10% K lowers the acceptor melting point by about 15° C., to approximately 270° C., depending on nitrite content.

The FIG. 2 results were obtained from a computer simulation of the thermodynamics of the liquid acceptor, incorporating the assumption of ideal behavior of all species, and thus slight variations can be expected in actual results.

All told, acceptor compositions of greater than 75% Na with at least ¼% oxide are preferred, and about 90% Na is most preferred.

I claim:

1. A continuous process for producing oxygen from cleaned and dried air and a liquid oxygen acceptor consisting essentially of a mixture of alkali metal nitrate and nitrite salt, comprising the steps of:
   (a) countercurrently contacting the air at a pressure between 1 and 25 ATA in an adiabatic absorber with the acceptor which has been cooled to below about 540° C., thereby oxidizing the acceptor;
   (b) heating the oxidized acceptor to at least about 580° C. by sensible heat exchange with oxygen depleted acceptor of step (e);
   (c) further heating the oxidized acceptor to at least about 620° C. from a source of heat consisting of less than 80 kcal per mole of $O_2$ produced;
   (d) separating product oxygen from the heated acceptor, whereby oxygen depleted acceptor is obtained;
   (e) cooling the oxygen depleted acceptor to below about 580° C. by sensible heat exchange with the oxidized accept of step (b);
   (f) further cooling the oxygen depleted acceptor to below about 540° C. by external heat rejection;
   (g) recycling the cooled acceptor to step (a) by pumping to elevated pressure;
   (h) maintaining the absolute absorber pressure at greater than one to no more than four times the absolute pressure of the step (d) desorption; and
   (i) recovering at least 80% of the oxygen in the supply air as product.

2. The process according to claim 1, further comprising adjusting the acceptor pressure in the higher temperature acceptor heating step to a value low enough to cause at least half of the product oxygen to desorb in said heater.

3. The process according to claim 1, further comprising maintaining the acceptor cationic composition at least 75% sodium cations.

4. The process according to claim 1, further comprising coproducing an $N_2$ product, compressing the supply air to approximately the desired $N_2$ pressure, and withdrawing product $N_2$ from the absorber overhead.

5. The process according to claim 2 further comprising heating a process stream to a useful temperature of at least about 260° C. by the heat rejected when cooling the oxygen depleted acceptor.

6. The process according to claim 2 further comprising countercurrently contacting the acceptor which is heated to at least 620° C. with a nitrogen containing gas so as to desorb additional oxygen product at lower purity.

7. The process according to claim 1 further comprising reducing the pressure of the acceptor after the first $O_2$ product withdrawal, and withdrawing a second $O_2$ product stream at said reduced pressure.

* * * * *